(No Model.)
A. DE B. LOVETT.
SEAT LOCK.
No. 353,228. Patented Nov. 23, 1886.
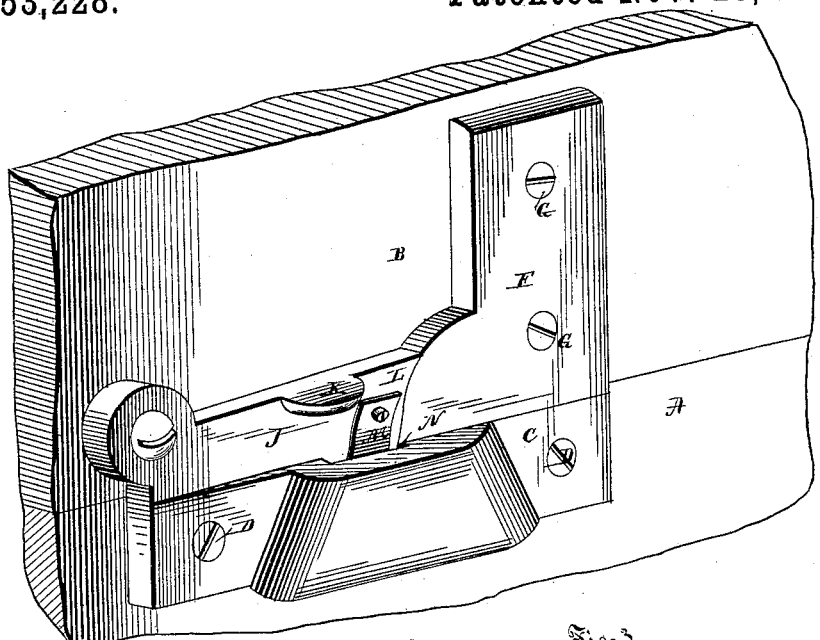
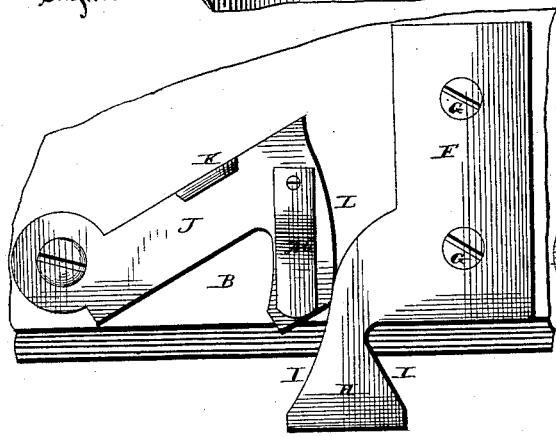
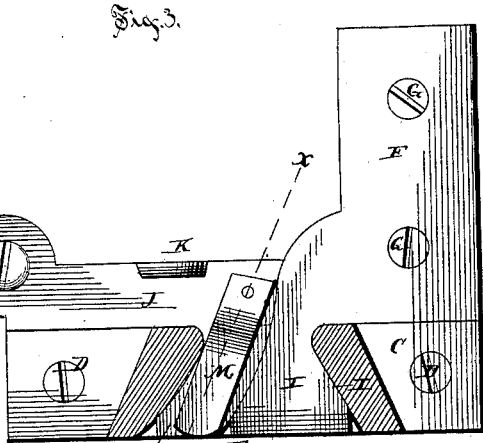
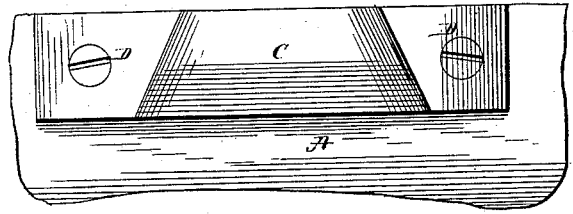
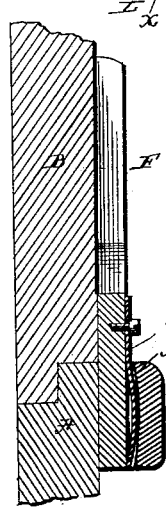
WITNESSES
C. H. Ourand
Edward Stanton
INVENTOR
Antoine de B. Lovett
By Louis Bagger & Co.
Attorneys

UNITED STATES PATENT OFFICE.

ANTOINE DE BULEN LOVETT, OF GENEVA, ASSIGNOR TO P. S. HADGER, OF AUBURN, NEW YORK.

SEAT-LOCK.

SPECIFICATION forming part of Letters Patent No. 353,228, dated November 23, 1886.

Application filed April 10, 1886. Serial No. 198,484. (No model.)

*To all whom it may concern:*

Be it known that I, ANTOINE DE BULEN LOVETT, a citizen of the United States, and a resident of Geneva, in the county of Ontario and State of New York, have invented certain new and useful Improvements in Fastenings for Vehicle-Seats; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a portion of a seat and of the side of the box of a vehicle, showing my improved fastening applied. Fig. 2 is a front view showing the parts separated. Fig. 3 is a front view showing the fastening locked and the face-plate of the lower fastening broken away; and Fig. 4 is a sectional view on line $x$ $x$, Fig. 3.

Similar letters of reference indicate corresponding parts in all the figures.

My invention has relation to fastenings for securing the feet at the ends of seats to the upper edges of the sides of the bodies of vehicles; and it consists in the improved construction and combination of parts of the same, as hereinafter more fully described and claimed.

In the accompanying drawings, the letter A indicates a portion of the side of the box or body of a vehicle, and B indicates a portion of the foot of the seat, and the side of the vehicle-body is provided with a plate, C, secured at its ends to the side by means of fastening-screws D, and formed with a recess, E, in its inner side, the ends of which recess diverge downwardly, as shown clearly in Fig. 3.

A plate or flat bar, F, is secured with its upper portion to the side of the foot of the seat by means of fastening-screws G, and the lower end, H, of this flat bar is formed with downwardly-diverging side edges, I I, having an incline corresponding to the incline of the ends of the recess in the lower plate.

A hook, J, is pivoted upon the side of the seat-foot, and has a lip, K, upon its inner arm, for the purpose of providing a more convenient hold when tilting the hook, and the outer hook-arm, L, has an incline corresponding to the incline of the edges of the flat bar and of the ends of the recess, so that it may be inserted into the recess from above when the foot of the seat is placed with its edge resting upon the edge of the side of the box, and when the lower end of the flat bar is inserted into the recess of the plate with its rear inclined edge fitting against the rear inclined end of the recess. The hook may be held firmly within the end of the recess, bearing against the forward inclined edge of the lower end of the upper bar and against the forward end of the recess by means of a bulged flat spring, M, secured at its upper end to the upper end of the hook-arm at its outer side, which bulged spring may fit into a bulged groove, N, formed in the side of the recess, the said spring and groove preventing the hook from accidentally becoming disengaged, and thus allowing the lip at the lower end of the bar upon the foot of the seat from getting out of the recess. It will thus be seen that the lip and the hook will retain the seat in position upon the upper edges of the body of the vehicle, each foot of the seat and each side of the vehicle-body being provided, respectively, with a bar having the lip and a hook, and with a recessed plate, the said fastenings being secured to the inner sides of the feet of the seat and of the sides of the vehicle-body.

Having thus described my invention, I claim and desire to secure by Letters Patent of the United States—

In a seat-lock, the combination of a recessed plate having a groove formed in one side of said recess, a bar having an inclined edge or notch at its bottom, a hook, and a flat bulged spring upon one side of said hook.

In testimony that I claim the foregoing as my own I have hereunto affixed my signature in presence of two witnesses.

ANTOINE DE BULEN LOVETT.

Witnesses:
    W. F. O'BRIEN,
    E. S. INNET.